A. HUCH.
PROCESS OF PRESERVING FRUITS OR VEGETABLES.
APPLICATION FILED JULY 22, 1907.
909,600.
Patented Jan. 12, 1909.
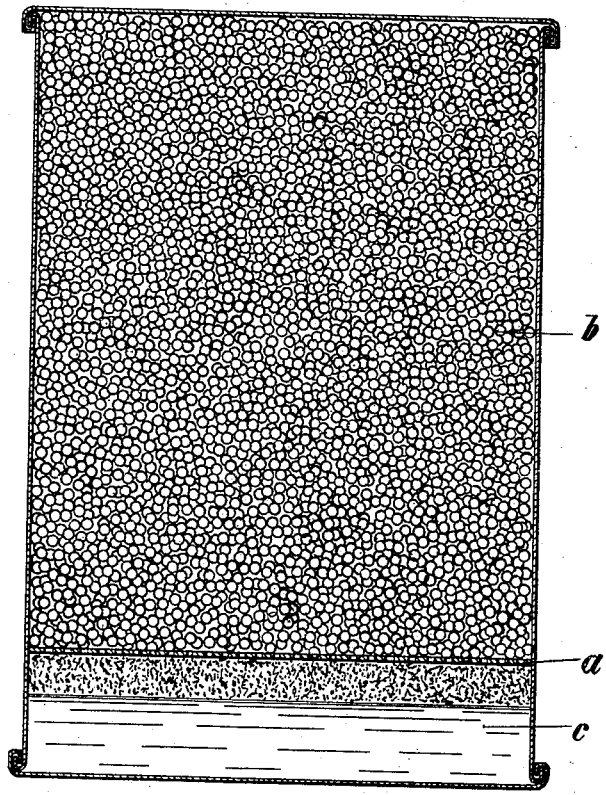
Witnesses:
Inventor
Arthur Huch
By
James L. Norris.
Atty

UNITED STATES PATENT OFFICE.

ARTHUR HUCH, OF BRUNSWICK, GERMANY.

PROCESS OF PRESERVING FRUITS OR VEGETABLES.

No. 909,600.　　　　　Specification of Letters Patent.　　　Patented Jan. 12, 1909.

Application filed July 22, 1907. Serial No. 385,076.

*To all whom it may concern:*

Be it known that I, ARTHUR HUCH, manufacturer, subject of the Emperor of Germany, residing at Brunswick, Duchy of Brunswick, Empire of Germany, have invented certain new and useful Improvements in Processes of Preserving Fruit or Vegetables, of which the following is a specification.

My invention relates to improvements in a process of preserving fruit or vegetables and the object of the improvements is to modify the process heretofore used for boiling some kinds of food by means of steam instead of water in such a way, as to adapt the same to preserving fruit and vegetables, for which purpose the said process could not heretofore be used.

A further object of the improvements is to preserve the flavor of the fruits and vegetables which has frequently been deteriorated by the continuous contact, within the preserving jar, of the preserved fruit and the water.

A very important object of the improvements is to prevent the fruit or vegetables from forming a gelatinous substance within the surrounding water, which is particularly of importance when preserving green peas.

I attain the aforesaid results by limiting the amount of water filled within the preserving jar, while the same is heated, to what is required for forming the steam necessary for boiling the fruit or vegetable, which steam, at the end of the process, is condensed and withdrawn from most or all of the fruit or vegetable.

In the accompanying drawing I have shown a preserving jar adapted to be used in my improved process.

In carrying my improved process into effect, the food to be preserved is filled into a jar or other appropriate vessel. To the vessel filled with the articles of food a quantity of water is added, the quantity, however, being very small and only enough to cover the bottom of the vessel to a height of one or two centimeters. The vessel is then closed or sealed to the air in order that air or steam cannot escape during the cooking operation, nor can air enter the vessel during the subsequent cooling thereof. Thereupon the vessels are highly heated preferably in a water or steam bath, a digester being suitable for this purpose, the interior temperature of the vessel rising above 212° Fahrenheit, the temperature of the digester or bath, to effect this result, ranging at least between 242.6 to 248° Fahrenheit. The water contained in the vessel is then converted into steam which fills the chamber of the vessel and cooks the contents thereof. After the cooking operation has been completed, the steam is condensed within the vessel as a result of the cooling thereof, the water being collected on the bottom of the vessel, this water, however, coming in contact only with a very small portion of the contents of the vessel. A water absorbing material is placed in the vessel in any suitable manner, cotton, paper, asbestos, porous clay, sponge and similar materials previously filled with water before boiling being appropriate, the water contained in the absorbing material being converted into steam during the boiling operation, and is afterward re-absorbed by the absorbing material upon cooling of the vessel. Even by tilting the vessel, the contents may be held out of contact with the water or moisture. For the same purpose, vessels provided with double bottoms can be used, such a vessel being shown in the accompanying drawing, the upper bottom $a$ being perforated or provided with perforated fillers. The contents of the vessel rest on this upper bottom or the filler in the space $b$, and the water is contained under the bottom $a$ and in the space $c$ so that the contents of the vessel do not come in contact with the water. A water absorbing medium can also be used in a vessel such as that just described, the water absorbing material being placed between the two bottoms or between the bottom and the filler. In this manner the contents of the vessel are prevented from coming in contact with the water and with the water absorbing material.

The process embodying my present invention possesses many advantages over preserving processes heretofore practiced. For instance, the foods preserved in the manner above described are of a superior quality by reason of having been cooked in steam, as their valuable and tasty ingredients are not destroyed by water. With some vegetables, such for instance, as green peas, the formation of the so-called gelatinous substances usually in the form of a thick pulpy mass is avoided, as the peas, when cooked only by steam, do not come in contact with water and therefore the extraction of the strength particularly of the larger peas and the subsequent conversion into a gelatinous mass upon the cooling of the vessel, is avoided. Furthermore, in preserving such foods that possess a strong flavor after boiling, the flavor is taken up by the water because of the fact that the foods lie continuously in the water, so that the flavor is thus lost.

As distinguished from the well known sterilizing process wherein the glass receptacles are provided with a closure which, during the preserving process permits the exit of air, my improved process possesses the distinguishing feature that no air from the receptacle or vessel can escape during the cooking operation, and no inward pressure takes place within the vessel after the cooling thereof so that the usual cheap and unbreakable tin cans or vessels can be used without danger of inward impression or bulging, and for this reason, tin receptacles are well adapted for use in connection with the improved process.

During the preserving operation, no air escapes from the interior of the vessel, a high pressure consequently forming therein because of the combined expansion of the air and steam. This high pressure produces a deep penetration of the mixed steam and air into the pores of the food and thereby produces an effectual sterilization.

A material advantage is also accomplished in the saving of heat in preserving according to the present process as distinguished from the usual process of preserving in liquid. In order to secure the evaporation of quantities of water just sufficient to fill the chamber of the vessel with steam of the usual tension or pressure, an exceptionally small amount of caloric energy is necessary as distinguished from those processes wherein a quantity of water covering the contents of the vessel is necessarily heated to the requisite temperature.

One of the greatest advantages obtained by the present process is the reduction of weight and the consequent saving of freight charges, the weight of the quantity of fluid which would otherwise be contained in the empty chamber of the vessel being saved.

Claim:

A process of preserving food cooked in steam which consists in inclosing the food in a vessel containing a moisture-absorbing material in the bottom thereof, adding to the vessel a quantity of liquid just sufficient to saturate the said material, then hermetically sealing the vessel, heating the contents of the vessel to convert the moisture contained in the said material into steam sufficient in volume to fill the vessel and cook the food, and allowing the vessel to cool whereby the steam is condensed and absorbed by the absorbing material and held separated from the food, a subsequent heating of the vessel causing a reconversion of the moisture in the absorbing material into steam to re-heat the food in the vessel, the latter remaining hermetically sealed throughout the process.

In testimony whereof I have hereunto set my hand in presence of two subscribing witnesses.

ARTHUR HUCH.

Witnesses:
 WILHELM LEHRKE,
 JULIUS SECKEL.